(12) United States Patent
Chang

(10) Patent No.: US 11,982,642 B2
(45) Date of Patent: May 14, 2024

(54) MONITORING DEVICE OF LIQUID PIPELINE

(71) Applicant: United Benefit Corp., New Taipei (TW)

(72) Inventor: Yuan Hse Chang, New Taipei (TW)

(73) Assignee: United Benefit Corp., New Taipei (TW)

( * ) Notice: Subject to any disclaimer, the term of this patent is extended or adjusted under 35 U.S.C. 154(b) by 23 days.

(21) Appl. No.: 17/654,286

(22) Filed: Mar. 10, 2022

(65) Prior Publication Data
US 2022/0299477 A1    Sep. 22, 2022

(30) Foreign Application Priority Data

Mar. 19, 2021   (TW) .................................. 110110056

(51) Int. Cl.
| | |
|---|---|
| *G01N 29/24* | (2006.01) |
| *G01N 29/06* | (2006.01) |
| *G01N 29/22* | (2006.01) |

(52) U.S. Cl.
CPC ....... *G01N 29/0609* (2013.01); *G01N 29/222* (2013.01); *G01N 29/24* (2013.01); *G01N 2291/022* (2013.01)

(58) Field of Classification Search
CPC .. G01N 29/0609; G01N 29/222; G01N 29/24; G01N 29/024; G01N 29/4427; G01N 2291/022; G01N 2291/2634; G01F 1/74; G01F 23/2962; G01F 25/00; G01F 1/668
See application file for complete search history.

(56) References Cited

U.S. PATENT DOCUMENTS

| | | | | |
|---|---|---|---|---|
| 2003/0172743 | A1* | 9/2003 | Ao | G01F 1/667 |
| | | | | 73/861.27 |
| 2019/0154480 | A1* | 5/2019 | Schöb | G01F 15/02 |
| 2019/0242851 | A1* | 8/2019 | Sinha | G01N 29/024 |
| 2020/0326216 | A1* | 10/2020 | Sarkissian | G01F 1/662 |

* cited by examiner

*Primary Examiner* — Suman K Nath
(74) *Attorney, Agent, or Firm* — Wang Law Firm, Inc.

(57) ABSTRACT

A monitoring device of liquid pipeline includes a fixture detachably fixed to an outer surface of a pipeline, a first ultrasonic probe disposed in the fixture, a processing module having stored a minimum signal threshold, and a display unit connecting to the processing module. The processing module controls the first ultrasonic probe transmitting a first sensing signal and receiving a first reflection signal corresponding to the first sensing signal along a radial direction of the pipeline, and analyzes signal of first period and second period signal from the first reflection signal. If the processing module determines that the signal of first period signal is greater than and the signal of second period signal less than the minimum signal threshold, the processing module generates a warning signal that represents abnormality of the first ultrasonic probe or liquid in the pipeline. The display unit displays the warning signal.

7 Claims, 12 Drawing Sheets

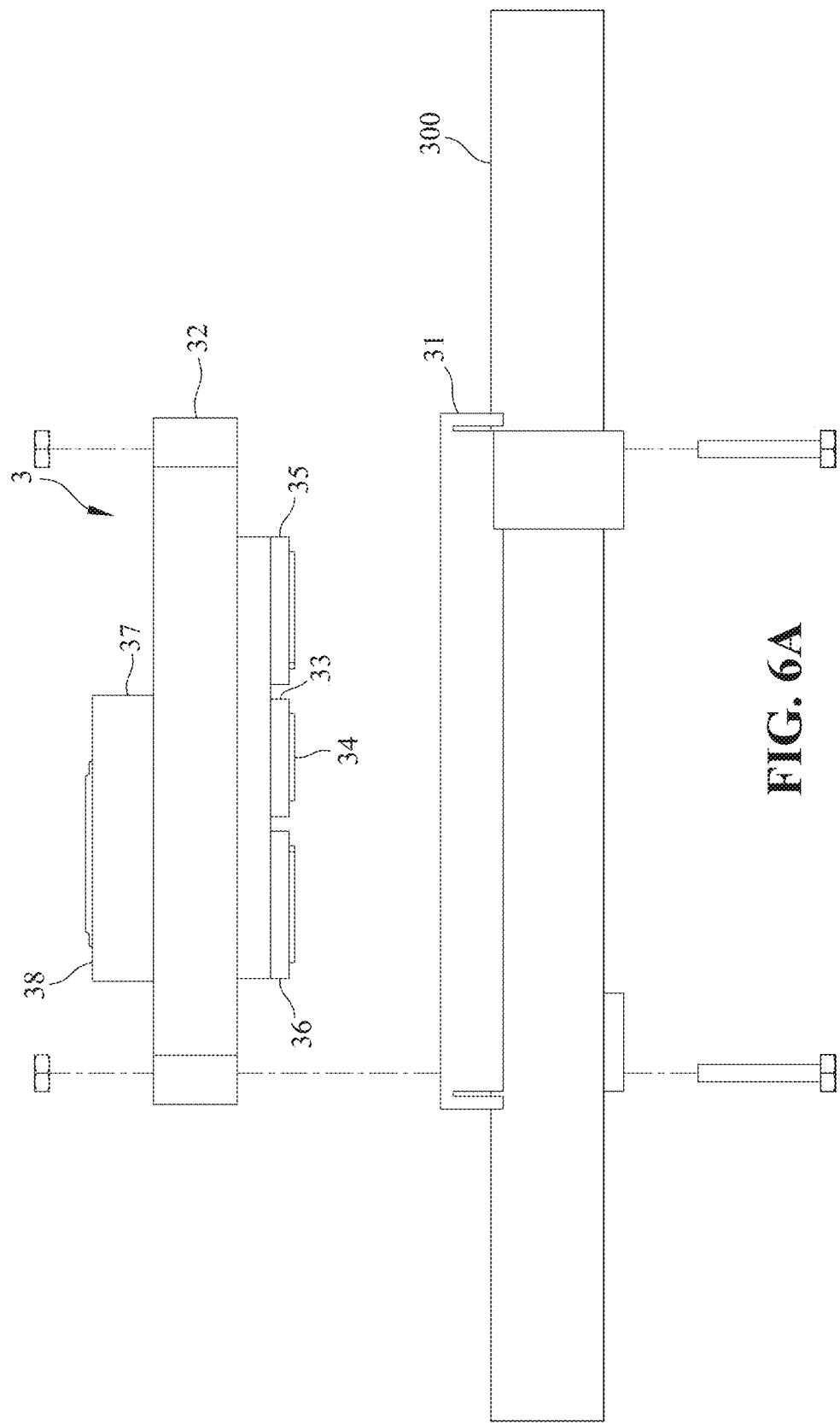

MONITORING DEVICE OF LIQUID PIPELINE

CROSS-REFERENCE TO RELATED APPLICATION

This application claims the priority of Taiwanese patent application No. 110110056, filed on Mar. 19, 2021, which is incorporated herewith by reference.

BACKGROUND OF THE INVENTION

1. Field of the Invention

The present invention relates generally to a monitoring device, and more particularly, to a monitoring device of liquid pipelines.

2. The Prior Arts

The process of mass-producing products nowadays in the industry requires the use of storage tanks and pipelines to store and transport various liquids. The data of the states of the pipelines and liquids, ranging from the temperature, pressure, flow rate, viscosity, composition, impurities, air bubbles of the liquid in the pipeline to the thickness, material, defects, etc. of the pipeline, are important factors related to production cost, efficiency, yield and safety. Therefore, manufacturers have developed a wide range of measurement equipment, such as thermometers, pressure gauges, flow meters, viscometers, and thickness gauges, for measuring liquids and pipelines.

According to the installation method, the equipment for measuring liquids and pipelines is divided into invasive (pipeline) type and non-invasive type. The invasive device must at least set the sensing element into the pipeline to directly contact the liquid for measurement. The measurement result of the invasive device has high accuracy, but is prone to the problem of liquid leakage. The non-invasive equipment is easy to install, but the accuracy of the measurement results is inferior. When the sensor is installed at a deviated position, the pipeline wears, or the liquid or environmental conditions change too much, the abnormality of inability to measure may even occur, and it is difficult for the personnel at the production site to judge that the error or abnormality is caused by the equipment, pipeline, liquid or environment. Usually, the abnormality needs to be eliminated by the technical personnel of the equipment manufacturer, which not only consumes time but also affects production.

In the process of liquid storage and transportation, the conditions of empty pipes, liquid composition change, such as impurities, bubbles or separation, or environmental condition change, such as temperature, pressure, pipeline material, will seriously affect the process efficiency and product yield. At present, liquid measurement equipment manufacturers have not yet developed equipment that can monitor anomalies, such as empty pipes and changes in liquid composition. It is imperative for the manufacturing industries that use liquids to find solutions for monitoring the liquid state of pipelines with accuracy and convenience at all time.

SUMMARY OF THE INVENTION

In order to solve the aforementioned problems, the present invention provides a monitoring device of liquid pipelines, comprising: a fixture, a first ultrasonic probe, a processing module, and a display unit. The fixture is detachably fixed on an outer surface of the pipeline. The first ultrasonic probe is arranged in the fixture. The processing module is connected to the first ultrasonic probe and stores a minimum signal threshold, and controls the first ultrasonic probe to transmit a first sensing signal along a radial direction of the pipeline and receive a first reflection signal corresponding to the first sensing signal. According to the time of a first inner surface and a second inner surface that are respectively radially adjacent to and opposite to the first ultrasonic probe reflect the first sensing signal to the first ultrasonic probe, the first reflection signal is analyzed to obtain a first period signal and a second period signal; and if the first period signal is greater than the minimum signal threshold and the second period signal is less than the minimum signal threshold, a warning signal representing the abnormality of the first ultrasonic probe or the liquid in the pipeline is generated. The display unit is connected to the processing module for displaying a warning signal.

In a preferred embodiment, from the time point when the first sensing signal is emitted, the time for distinguishing the first period signal and the second period signal is between the time for the first inner surface to reflect the first sensing signal to the first ultrasonic probe and the time for the second inner surface to reflect the first sensing signal to the first ultrasonic probe.

In a preferred embodiment, the processing module analyzes a time difference between the first inner surface and the second inner surface reflecting the first sensing signal to the first ultrasonic probe, and according to the time difference and twice the radial distance between the first inner surface and the second inner surface, produces a measured ultrasonic speed of the liquid.

In a preferred embodiment, the processing module stores a maximum signal threshold; if the processing module determines that the first period signal is greater than the maximum signal threshold and the second period signal is less than the minimum signal threshold, an inspection signal is generated indicating that the fixture is not correctly fixed or the first ultrasonic probe is not correctly set; the display unit displays the inspection signal.

In a preferred embodiment, the monitoring device of liquid pipelines further comprises: a casing and a temperature sensor, wherein the casing is arranged on the fixture, the temperature sensor and the first ultrasonic probe are arranged inside the casing and connected to the processing module, and the temperature sensor is used to measure the temperature of the outer surface of the pipeline.

In a preferred embodiment, if the processing module determines that the first period signal is greater than the maximum signal threshold and the second period signal is less than the minimum signal threshold, an inspection signal indicating that the fixture is not correctly fixed or the casing is not correct set; the display unit displays the inspection signal.

In a preferred embodiment, the monitoring device of liquid pipelines further comprises: a second ultrasonic probe, arranged on the fixture along the radial direction of the pipeline with the first ultrasonic probe on opposite positions, and connected to the processing module; the processing module controlling the second ultrasonic probe to receive the first sensing signal passing through the pipeline along the radial direction of the pipeline, if the processing module determining that the first sensing signal received by the second ultrasonic probe to be less than the minimum signal threshold, generating a warning signal representing the abnormality of the first ultrasonic probe or the liquid in the pipeline.

In a preferred embodiment, if the processing module determines that the first sensing signal received by the second ultrasonic probe is greater than the minimum signal threshold, then the processing module analyzes a time difference between the second inner surface reflecting the first sensing signal to the first ultrasonic probe and the second ultrasonic probe receiving the first sensing signal, and according to the time difference and twice the radial distance between the first inner surface and the second inner surface, produces a measured ultrasonic speed of the liquid.

In a preferred embodiment, the monitoring device of liquid pipelines further comprises: a third ultrasonic probe and a fourth ultrasonic probe, arranged in the fixture, and respectively connected to the processing module; the processing module controlling the third ultrasonic probe to transmit a third sensing signal along a direction forming an angle with the radial direction of the pipeline and the fourth ultrasonic probe to receive the third sensing signal, and analyzing the transmission time of the third sensing signal from the third ultrasonic probe to the fourth ultrasonic probe; and processing module controlling the fourth ultrasonic probe to transmit a fourth sensing signal along a direction forming a symmetrical angle with the angle, and the third ultrasonic probe to receive the fourth sensing signal, and analyzing the transmission time of the fourth sensing signal from the fourth ultrasonic probe to the third ultrasonic probe; according to transmission distance and the transmission time difference between the third sensing signal and the fourth sensing signal, the measured ultrasonic speed of the liquid, the radial area of the pipeline, and an incident angle of the third sensing signal or the fourth sensing signal passing through the liquid, the processing module generating the flow rate of the liquid.

In a preferred embodiment, if the processing module determines that the second period signal is greater than the minimum signal threshold and the third sensing signal or the fourth sensing signal is less than the minimum signal threshold, the processing module generates a calibration signal indicating the need to adjust the relative positions of the third ultrasonic probe and the fourth ultrasonic probe.

The monitoring device of the liquid pipelines of the present invention uses the ultrasonic signal to monitor the pipeline and the liquid, which can greatly reduce the interference of environmental noise, accurately determine whether the pipeline is empty, or has a large number of air bubbles or a large number of solids, and the present invention can self-determine whether the sensing element is correctly installed on the pipeline, to improve the reliability of monitoring data and achieve the purpose of accurate and convenient monitoring of pipeline liquid at all time.

BRIEF DESCRIPTION OF THE DRAWINGS

The present invention will be apparent to those skilled in the art by reading the following detailed description of a preferred embodiment thereof, with reference to the attached drawings, in which:

FIG. 6A is a schematic side view of another embodiment of the monitoring device of liquid pipelines of the present invention;

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
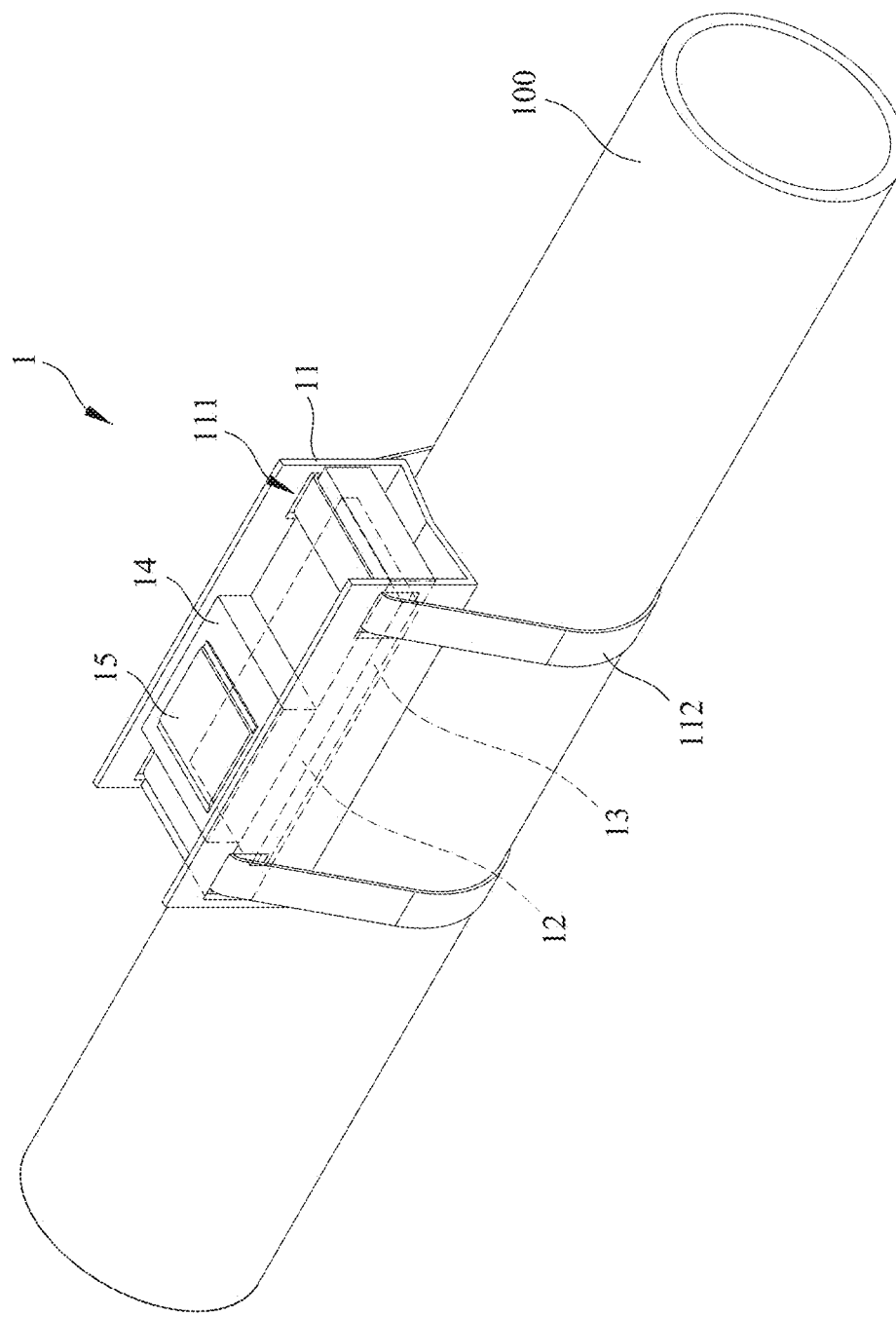
FIG. 1 is a schematic side view of a monitoring device of liquid pipelines according to an embodiment of the present invention.

FIG. 1 is a schematic side view of a monitoring device of liquid pipelines according to an embodiment of the present invention. As shown in FIG. 1, the monitoring device of liquid pipeline 1 includes: a fixture 11, a first ultrasonic probe 12, an ultrasonic coupling layer 13, a processing module 14, and a display unit 15. The fixture 11 is detachably fixed to the outer surface of a pipeline 100. The first ultrasonic probe 12 is arranged in the fixture 11, the ultrasonic coupling layer 13 is sandwiched between the first ultrasonic probe 12 and the first outer surface of the pipeline 100, and the processing module 14 is connected via wired or wireless communication to the first ultrasonic probe 12, and the display unit 15 is connected to the processing module 14 via wired or wireless communication.

In the process of ultrasonic transmission through the medium, the greater the difference in the acoustic impedance of the two media, the stronger the ultrasonic reflection at the interface of the two media; the smaller the difference in the acoustic impedance of the two media, the weaker the ultrasonic reflection at the interface of the two media. The first ultrasonic probe 12 mainly comprises a signal line, a piezoelectric material, an acoustic impedance matching layer, etc., and has the function of transmitting and receiving ultrasonic signals in a specific frequency range. The fixture 11 includes an accommodating groove 111 and a fastener 112. The first ultrasonic probe 12 is arranged in the accommodating groove 111, an opening is formed at the bottom of the accommodating groove 111, and the acoustic impedance matching layer is attached to the ultrasonic coupling layer 13 through the opening of the accommodating groove 111. The fastener 112 can press the first ultrasonic probe 12 and the pipeline 100, so that the opposite sides of the ultrasonic coupling layer 13 are respectively attached to the first ultrasonic probe 12 and the first outer surfaces of the pipeline 100, so as to avoid forming a gap between the first ultrasonic probe 12 and the pipeline 100 to affect the transmission of ultrasonic signals. The material of the ultrasonic coupling layer 13, such as, silicone oil, silicone rubber, rubber, etc., is similar to the acoustic impedance of the material of the pipeline 100, such as, copper, iron, stainless steel, polyvinyl chloride, polypropylene, so as to improve the energy ratio of the transmission of ultrasonic signals to pipeline 100.

The processing module 14 includes, such as, a microprocessor, a microcontroller, a clock generator, an electronic signal processor, a data multiplexer, a signal amplifier, an analog/digital signal converter, a memory, wired and wireless communications and other functional circuit combinations, and the memory pre-stores applications for processing ultrasonic signals, computing ultrasonic speed and liquid state data, and judging the minimum and maximum signal thresholds of ultrasonic signals. The display unit 15 is, for example, a lighting element or an existing liquid crystal or light emitting diode display capable of displaying text or image information. In the present embodiment, the processing module 14 and the display unit 15 are combined with the first ultrasonic probe 12 to form a stand-alone model; in other embodiments, the processing module 14 and/or the display unit 15 can be built in a remote monitoring computer device and a single or a plurality of first ultrasonic probes 12 are connected via wired or wireless communication.

Figure 2A:
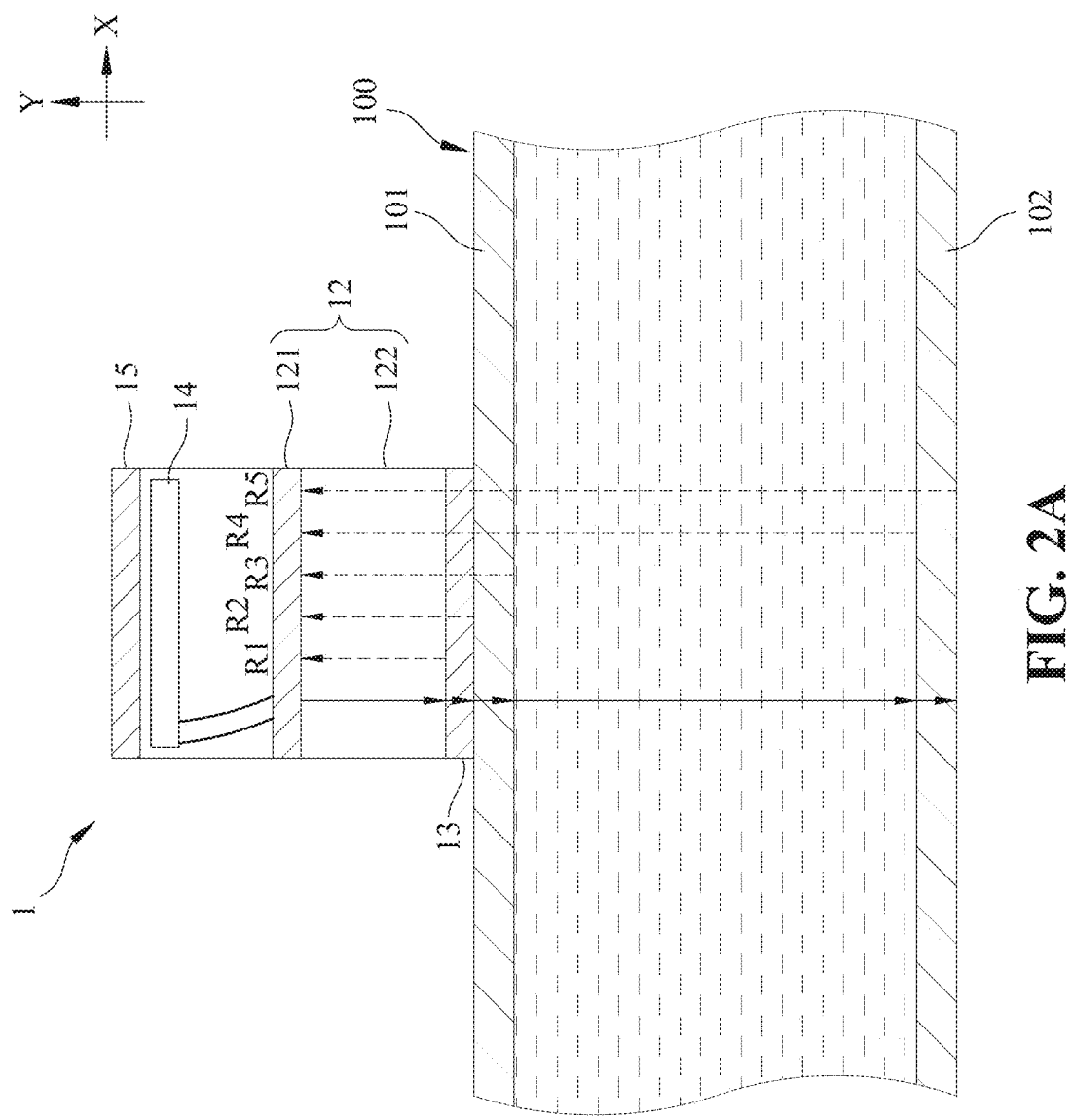
FIG. 2A is a schematic view of the monitoring device of liquid pipelines shown in FIG. 1 transmitting and receiving ultrasonic signals when the pipeline is full of liquid.

FIG. 2A is a schematic view of the monitoring device of liquid pipelines shown in FIG. 1 transmitting and receiving ultrasonic signals when the pipeline is filled with liquid. As shown in FIG. 2A, the processing module 14 can switch between the transmitting and receiving ultrasonic signals of the first ultrasonic probe 12 to control the first ultrasonic probe 12 to transmit a first sensing signal along the radial direction of the pipeline 100 (the Y-axis direction in FIG. 2A) and to receive a first reflection signal corresponding to the first sensing signal; the solid arrow symbol represents the first sensing signal transmitted by the first ultrasonic probe 12, and the dotted arrow symbol represents the corresponding first reflection signal.

When the pipeline 100 is filled with liquid, the piezoelectric material 121 of the first ultrasonic probe 12 generates a first sensing signal, and the first sensing signal passes through the acoustic impedance matching layer 122 and contacts the interface of the acoustic impedance matching layer 122 and the ultrasonic coupling layer 13, a part of the first sensing signal is reflected to the acoustic impedance matching layer 122 and the piezoelectric material layer 121 of the first ultrasonic probe 12, defined as the acoustic impedance matching layer interface reflection signal R1, and a part of the first sensing signal passes through the ultrasonic coupling layer 13 along the radial direction of the pipeline 100; when the first sensing signal passing through the ultrasonic coupling layer 13 contacts the interface between the ultrasonic coupling layer 13 and the first outer surface of the first ultrasonic probe 12 adjacent to the pipeline 100, a part of the first sensing signal is reflected to the ultrasonic coupling layer 13, the acoustic impedance matching layer 122 and and the piezoelectric material layer 121 of the first ultrasonic probe 12, defined as the ultrasonic coupling layer interface reflection signal R2, a part of the first sensing signal passes through a first pipe wall 101 of the pipeline 100 adjacent to the first ultrasonic probe 12 along the radial direction of the pipeline 100; when the first sensing signal passing through the first pipe wall 101 contacts the interface between a first inner surface of the first ultrasonic probe 12 and the liquid, a part of the first sensing signal is reflected to the first pipe wall 101, the ultrasonic coupling layer 13, and the acoustic impedance matching layer 122 and the piezoelectric material layer 121 of the first ultrasonic probe 12, defined as pipeline first inner surface reflection signal R3, a part of the first sensing signal passes through the liquid along the radial direction of the pipeline 100; when the first sensing signal passing through the liquid contacts the interface between the liquid and a second inner surface of the pipeline 100 opposite to the first ultrasonic probe 12, a part of the first sensing signal is reflected to the liquid, the first pipe wall 101, the ultrasonic coupling layer 13, and the acoustic impedance matching layer 122 and the piezoelectric material layer 121 of the first ultrasonic probe 12, defined as the pipeline second inner surface reflection signal R4, a part of the first sensing signal passes through a second pipe wall 102 of the pipeline 100 along the radial direction of the pipeline 100 opposite to the first ultrasonic probe 12; when the first sensing signal passing through the second pipe wall 102 contacts the interface between the second outer surface of the pipeline 100 and the air opposite to the first ultrasonic probe 12, because the material of the pipeline 100 and the air have a great difference in acoustic impedance, almost all the first sensing signal passing through the second pipe wall 102 is reflected to the second pipe wall 102, the liquid, the first pipe wall 101, the ultrasonic coupling layer 13, the acoustic impedance matching layer 122 and the electrical material layer 121 of the first ultrasonic probe 12, defined as the pipeline second outer surface reflection signal R5.

Figure 2B:
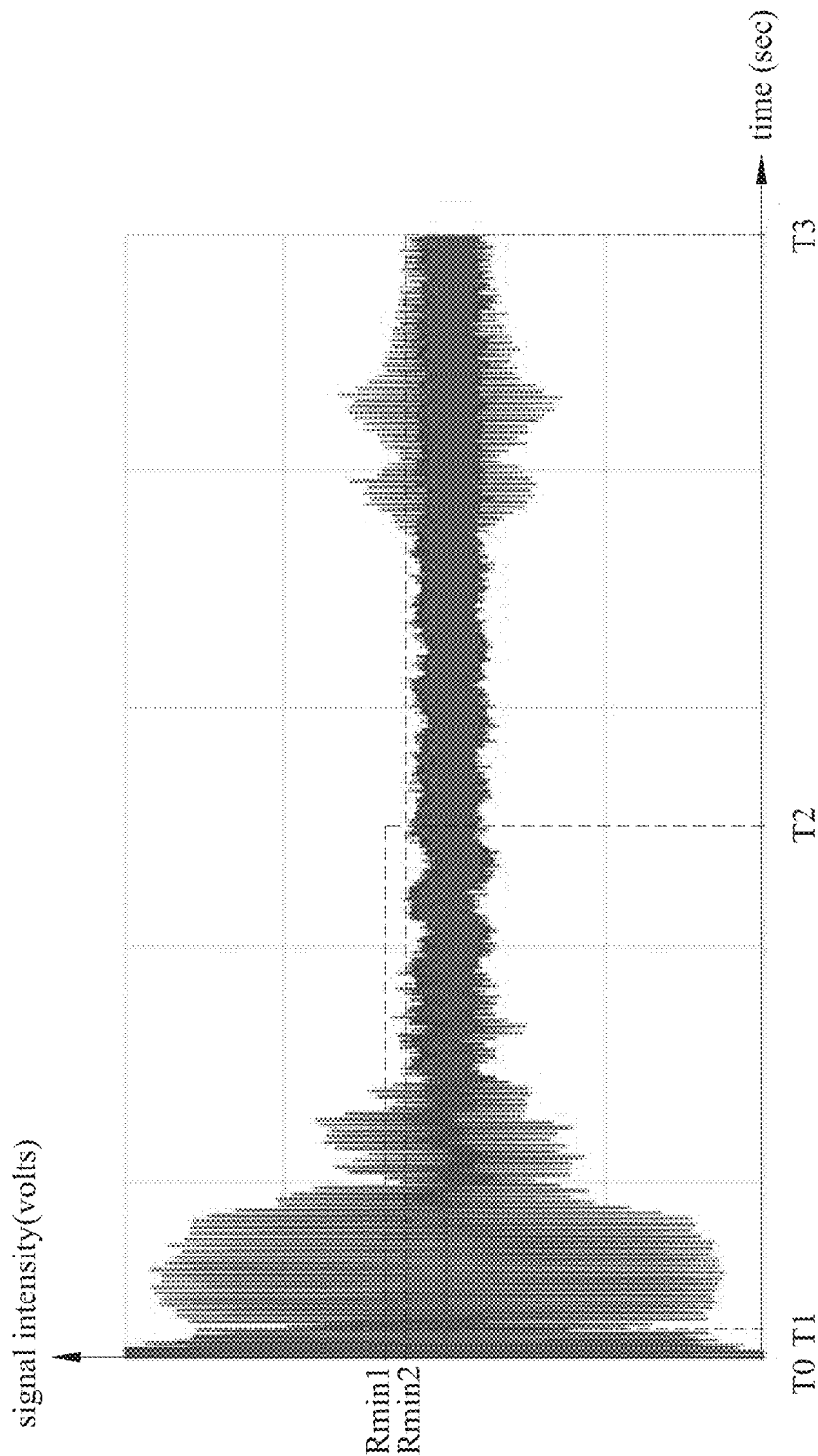
FIG. 2B is a schematic diagram of the time domain signal of receiving ultrasonic signals of the monitoring device of liquid pipelines shown in FIG. 2A transmitting and receiving ultrasonic signals when the pipeline is full of liquid.

FIG. 2B is a schematic diagram of a time domain signal of the monitoring device of liquid pipelines shown in FIG. 2A transmitting and receiving ultrasonic signals when the pipeline is full of liquid. As shown in FIGS. 2A and 2B, after the processing module 14 controls the first ultrasonic probe 12 to transmit the first sensing signal, the processing module 14 then controls the first ultrasonic probe 12 to receive the first reflection signal. The first reflection signal comes from the first sensing signal reflected by the interface of two materials with different acoustic impedances, including the acoustic impedance matching layer interface reflection signal R1, the ultrasonic coupling layer interface reflection signal R2, the pipeline first inner surface reflection signal R3, the pipeline second inner surface reflection signal R4, and the pipeline second outer surface reflection signal R5, wherein the acoustic impedance matching layer interface reflection signal R1, the receiving times of the ultrasonic coupling layer interface reflection signal R2, and the pipeline first inner surface reflection signal R3 by the first ultrasonic probe 12 are very close; the receiving times of the pipeline first inner surface reflection signal R3 and the pipeline second inner surface reflection signal R4 by the first ultrasonic probe 12 are separated, by the time that the ultrasonic signal takes to travel through the liquid along the radial direction of the pipeline 100; the receiving times of the pipeline second inner surface reflection signal R4 and the pipeline second outer surface reflection signal R5 by the first ultrasonic probe 12 are very close; therefore, in the situation where the pipeline 100 is full of liquid, the first reflection signal can be clearly distinguished as two signal wave groups separated from one another in the time domain.

The time point at which the first ultrasonic probe 12 starts to transmit the first sensing signal is defined as T0, the time point at which the transmission of the first sensing signal is completed is defined as T1, and the time length from T0 to T1 is, for example, 5, 10, or 15 microseconds; the time point at which the first ultrasonic probe 12 finishes receiving the first reflection signal is defined as T3, and the time length (T0 to T3) from the time point T0 when the first sensing signal starts transmitting to the time point T3 when the receiving of the first reflection signal finishes is related to the material of the pipeline, the liquid, and the diameter of the pipeline, and an upper limit of time length can be taken through empirical or theoretical study, such as 200, 400, 1000 microseconds. Generally, a pipeline with a 2-inch diameter finish receiving the first reflection signal in 400 microseconds. In the present invention, the time length of the first reflection signal is divided into successive first periods (T1 to T2) and the second period (T2 to T3) according to the time when the first sensing signal reflected by the first inner surface and the second inner surface of the pipeline 100 is received by the first ultrasonic probe 12. The signal received in the first period is defined as the first period signal, the signal received in the second period is defined as the second period signal, and the first period signal includes the acoustic impedance matching layer interface reflection signal R1, the ultrasonic coupling layer interface reflection signal R2, and the pipeline first inner surface reflection signal R3. The second period signal includes the pipeline second inner surface reflection signal R4 and the pipeline second outer surface reflection signal R5. The time point T2 of the second period is between the time point TR3 when the first ultrasonic probe 12 receives the pipeline first inner surface reflection signal R3 and the time point TR4 when the pipeline second inner surface reflection signal R4 is received. Counting from the time point T0 when the first sensing signal starts to transmit, the time length from T0 to TR3 is the sum that the first sensing signal travelling forth and the first reflection signal travelling back from the acoustic impedance matching layer 122, the ultrasonic coupling layer 13, and the first pipe wall 101 along the radial direction of the pipeline 100; the time length from T0 to TR4 is the sum that the first sensing signal travelling forth and the first reflection signal travelling back from the acoustic impedance matching layer 122, the ultrasonic coupling layer 13, the first pipe wall 101, and the liquid along the radial direction of the pipeline 100.

The material and size of the acoustic impedance matching layer 122 are known, and the time length TR3-1 for the first sensing signal and the first reflection signal to and from the acoustic impedance matching layer 122 along the radial direction of the pipeline 100 can be calculated using the formula: 2×the thickness of the acoustic impedance matching layer 122/the speed of the ultrasonic wave in the acoustic impedance matching layer 122, or obtained by actual measurement in advance; the material and size of the ultrasonic coupling layer 13 are known, and the time length TR3-2 for the first sensing signal and the first reflection signal to and from the ultrasonic coupling layer 13 along the radial direction of the pipeline 100 can be calculated using the formula: 2×the thickness of the ultrasonic coupling layer 13/the speed of the ultrasonic wave in the ultrasonic coupling layer 13, or obtained by actual measurement. The existing industry specification of the material and size of various pipelines have been standardized, for example, ISO15494 defines the size of industrial pipelines of different plastics. Under the condition that the outer diameters of the pipelines are similar and the material is the same, even if the pipeline belongs to different industrial standards, the actual measurement result of the time difference of the ultrasonic signal passing through the pipe wall is within 10 microseconds, usually about 1 to 3 microseconds. Accordingly, the processing module 14 can pre-store the speed of the ultrasonic signal on the pipe wall of various pipelines, and the user can enter the pipe type or pipe wall thickness before the user starts monitoring. The time length TR3-3 for the first sensing signal and the first reflection signal to and from the first pipe wall 101 along the radial direction of the pipeline 100 can be calculated using the formula: 2×the radial thickness of the pipe wall/the speed of ultrasonic waves in the pipe wall, or obtained by actual measurement; the normal speed of ultrasonic waves in liquids is between 600 and 2600 m/s. For the convenience of distinguishing the first period and the second period, the normal speeds of the ultrasonic wave in the liquids can be pre-stored in the processing module 14, and the user can input the inner diameter of the pipeline and select the pre-stored speed before starting the monitoring. The time length TR4-1 for the first sensing signal and the first reflection signal to and from through the liquid along the radial direction of the pipeline 100 can be calculated using the formula: 2×the inner diameter of the pipeline/the pre-stored speed of the ultrasonic wave in liquid, or obtained by actual measurement. The time point TR3 can be obtained by summation of the time point T0 when the first sensing signal starts to transmit and the time lengths TR3-1, TR3-2, and TR3-3. The time point TR4 can be obtained by the summation of TR3 and the time length TR4-1. Therefore, the time point T2 that distinguishes the first period and the second period is determined, i.e., TR3<T2<TR4. Taking the actual measurement results of common pipelines as an example, from the time point T0 when the first sensing signal starts to transmit, the time point T2 for distinguishing the first period and the second period is between 15 and 200 microseconds, for example: 20 to 50 microseconds seconds, 50 to 100 microseconds, 100 to 150 microseconds, 150 to 200 microseconds.

The processing module 14 pre-stores the minimum signal threshold Rmin, and the definition of the minimum signal threshold Rmin can use the measured minimum signal threshold of the known pipeline 100 filled with liquid or an algorithm to calculate the current dynamic threshold. The dynamic threshold algorithm includes, but is not limited to, time domain method: first filter the time domain signal to remove non-ultrasonic frequency noise, determine the signal baseline and the local maximum signal, so as to use specific ratio, such as but not limited to: 5%, 10%, 15% or 20%, of the local maximum signal as the minimum signal threshold; or, frequency domain method: Fourier transform the time domain signal into the frequency domain signal, and select the ultrasonic frequency range, determine the signal baseline and local maximum signal strength, take a specific ratio, such as but not limited to: 5%, 10%, 15% or 20%, of the local maximum signal strength as the minimum signal threshold. Because the signal strength of the signal in the first period is greater than the signal strength in the second period, the processing module 14 respectively presets the minimum signal threshold Rmin1 of the first period and the minimum signal threshold Rmin2 of the second period, and analyzes from the first reflection signal in the time domain or the frequency domain for the first period signal and the second period signal, compares respectively whether the first period signal and/or the second period signal is greater than the first period minimum signal threshold Rmin1 and the second period minimum signal threshold Rmin2, and then determines whether the liquid status in the pipeline 100 is normal or abnormal.

If the processing module 14 determines that the first period signal is greater than the first period minimum signal threshold Rmin1 and the second period signal is greater than the second period minimum signal threshold Rmin2, then the processing module 14 can be based on the first period minimum signal threshold Rmin1 and the second period minimum signal threshold Rmin2 to analyze the time points at which the first ultrasonic probe 12 receives the pipeline first inner surface reflection signal R3 and the pipeline second inner surface reflection signal R4, respectively. For example, according to the time length TR3-1 of the first sensing signal and the first reflection signal travelling along the radial direction of the pipeline 100 to and from the acoustic impedance matching layer 122, the time length TR3-2 to and from the ultrasonic coupling layer 13, and the time length TR3-3 to and from the first pipe wall 101, the processing module 14 determines, among the first period signal, the time point of the third maximum wave peak or trough (local maximum or minimum) exceeding the first period minimum signal threshold Rmin1 as the time point of the pipeline first inner surface reflection signal R3; among the second period signal, the time point of the first maximum wave peak or trough exceeding the second period minimum signal threshold Rmin2 as the time point of the pipeline second inner surface reflection signal R4. The time difference between the first ultrasonic probe 12 receiving the pipeline first inner surface reflection signal R3 and the pipeline second inner surface reflection signal R4 is the time required by the first sensing signal and the first reflection signal to travel through the liquid back and forth between the first inner surface and the second inner surface, i.e., 2×the inner diameter of the pipeline 100. The processing module 14 can generate a measured ultrasonic speed in the liquid according to the time difference between the first ultrasonic probe 12 receiving the reflection of the first sensing signal by the first inner surface of the pipeline and by the second inner surface of the pipeline and 2 times of the inner diameter of the pipeline 100.

If the liquid in the pipeline 100 maintains a stable state, the measured ultrasonic speed of the liquid generated by the processing module 14 at regular intervals will fall within a certain range; if the liquid composition of the pipeline 100, such as, solute concentration rising, or liquid phase stratification, or temperature changes greatly, resulting in the change of the ultrasonic speed of the liquid generated by the processing module 14, the user can pre-store the normal liquid ultrasonic speed range and abnormal notification information, such as concentration change, temperature change or liquid phase stratification, beyond the normal liquid ultrasonic speed range in the processing module 14 according to the properties of the liquid, so that the monitoring device 1 of liquid pipelines of the present invention can monitor whether the composition or temperature of the liquid in the pipeline 100 is abnormal.

Figure 3A:
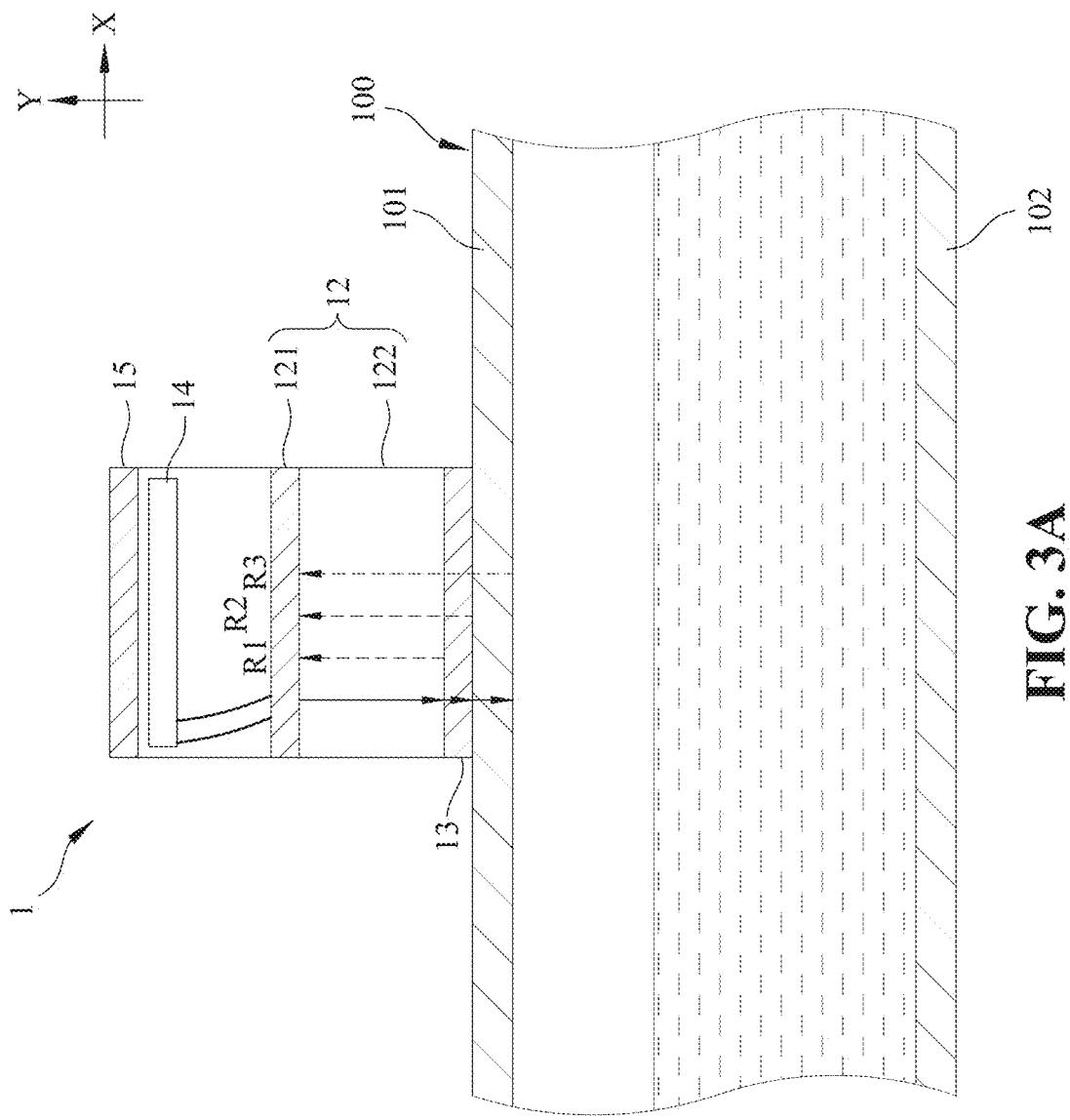
FIG. 3A is a schematic view of the monitoring device for liquid in the pipeline shown in FIG. 1 transmitting and receiving ultrasonic signals when the liquid in the pipeline is abnormal.

FIG. 3A is a schematic view of the monitoring device for liquid in the pipeline shown in FIG. 1 transmitting and receiving ultrasonic signals when the liquid in the pipeline is abnormal. In FIG. 3A, the solid arrows represent the first sensing signals emitted by the first ultrasonic probe 12, and the dashed arrows represent the first reflection signals corresponding to the first sensing signals. When the pipeline 100 has no liquid or contains a large amount of air bubbles or has a large amount of solids and other abnormal conditions, the processing module 14 controls the first ultrasonic probe 12 to transmit a first sensing signal, and the first sensing signal passes through the first pipe wall 101 of the pipeline 100 radically adjacent to the first ultrasonic probe 12, i.e., the Y-axis direction in FIG. 3A, due to the great difference in acoustic impedance between the material of the pipeline 100 and the air, air or air bubbles or solid objects block the first sensing signal from continuing to transmit along the radial direction of the pipeline 100. The interface between the first inner surface of the pipeline 100 radially adjacent to the first ultrasonic probe 12 and the air or air bubbles reflects most of the first sensing signal to the acoustic impedance matching layer 122 and the piezoelectric material layer 121 of the first ultrasonic probe 12, i.e., the acoustic impedance matching layer interface reflection signal R1, the ultrasonic coupling layer interface reflection signal R2, and the pipeline first inner surface reflection signal R3 of the pipeline. A small part of the first sensing signal is scattered or lost in the process of passing back and forth through the first pipe wall 101.

Figure 3B:
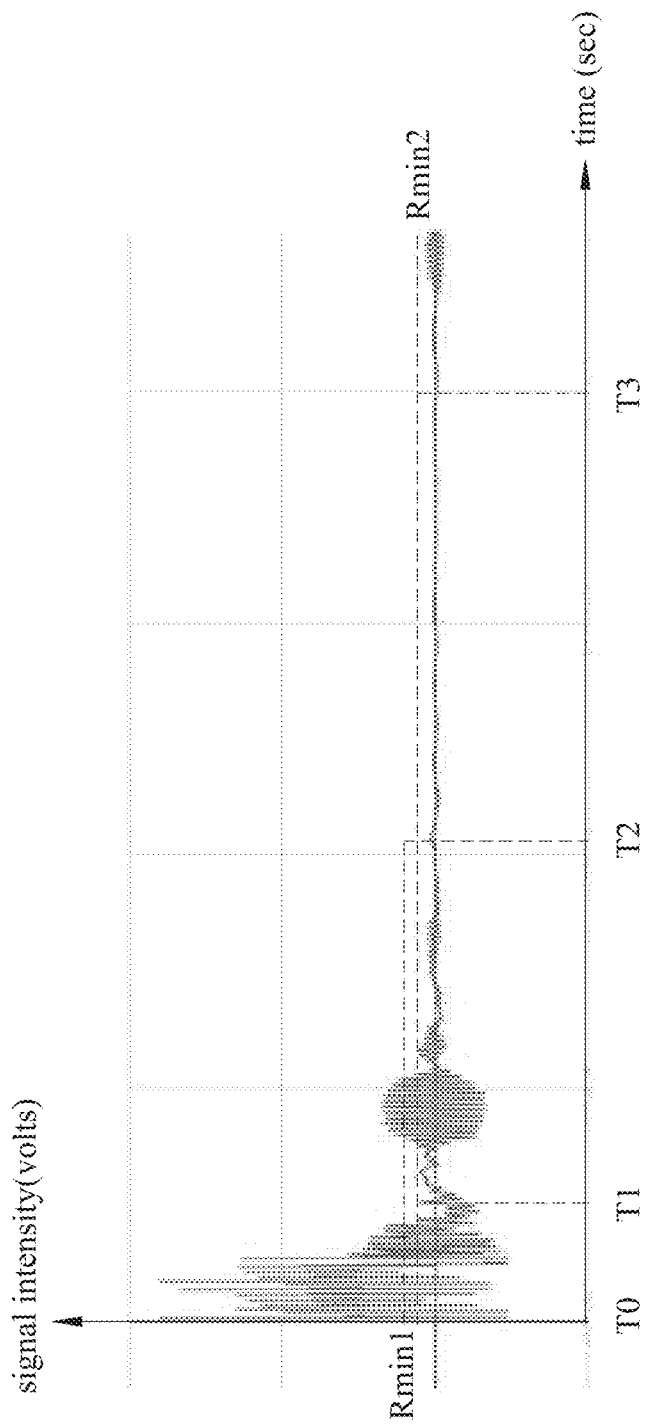
FIG. 3B is a schematic diagram of the time domain signal of receiving ultrasonic signals of the monitoring device of liquid pipelines shown in FIG. 3A transmitting and receiving ultrasonic signals when the liquid in the pipeline is abnormal.

FIG. 3B is a schematic diagram of a time-domain signal of the monitoring device of liquid pipelines shown in FIG. 3A transmitting and receiving ultrasonic signals when the liquid in the pipeline is abnormal. As shown in FIGS. 3A and 3B, the processing module 14 analyzes the first period signal and the second period signal from the first reflection signal, and determines that the first period signal is greater than the first period minimum signal threshold Rmin1 and the second period signal is smaller than the second period minimum signal threshold Rmin2. The processing module 14 generates a warning signal indicating that there is no liquid in the pipeline 100, i.e., an empty pipeline, or there is a large amount of air bubbles or a large amount of solids in the pipeline with abnormal liquid in the pipeline. After receiving the warning signal from the processing module 14, the display unit 15 displays the warning signal representing the abnormality of the liquid in the pipeline with light, text or image information. Using the empirical result of a 2-inch PVC pipe with a pipe wall thickness of 4 mm, the first ultrasonic probe emitting a first sensing signal with a frequency of 2 Mhz and an intensity of 10 V, at 20 degrees Celsius as an example, the maximum intensity of the first period signal of the empty pipeline is greater than 600 mV, and the second period signal is less than 80 mV; the maximum intensity of the first period signal with the pipeline filled with water is greater than 500 mV, and the second period signal is greater than 100 mV. The processing module 14 presets the first period minimum signal threshold Rmin1 to be 200 mV, and the second period minimum signal threshold Rmin2 to be 100 mV, so that the processing module 14 can determine whether the liquid in the pipeline 100 has an abnormal situation of empty pipeline, a large amount of air bubbles or a large amount of solids.

The function of the monitoring device of liquid pipelines of the present invention can be used to monitor the empty pipeline situation. When the monitoring device of liquid pipelines of the present invention is installed on the liquid level pipe of the liquid storage tank, the liquid level of the liquid storage tank can also be monitored. When the liquid level of the storage tank is lower than the installation height of the monitoring device of liquid pipelines, the monitoring device of liquid pipelines can display a warning signal for low liquid level.

Figure 4A:
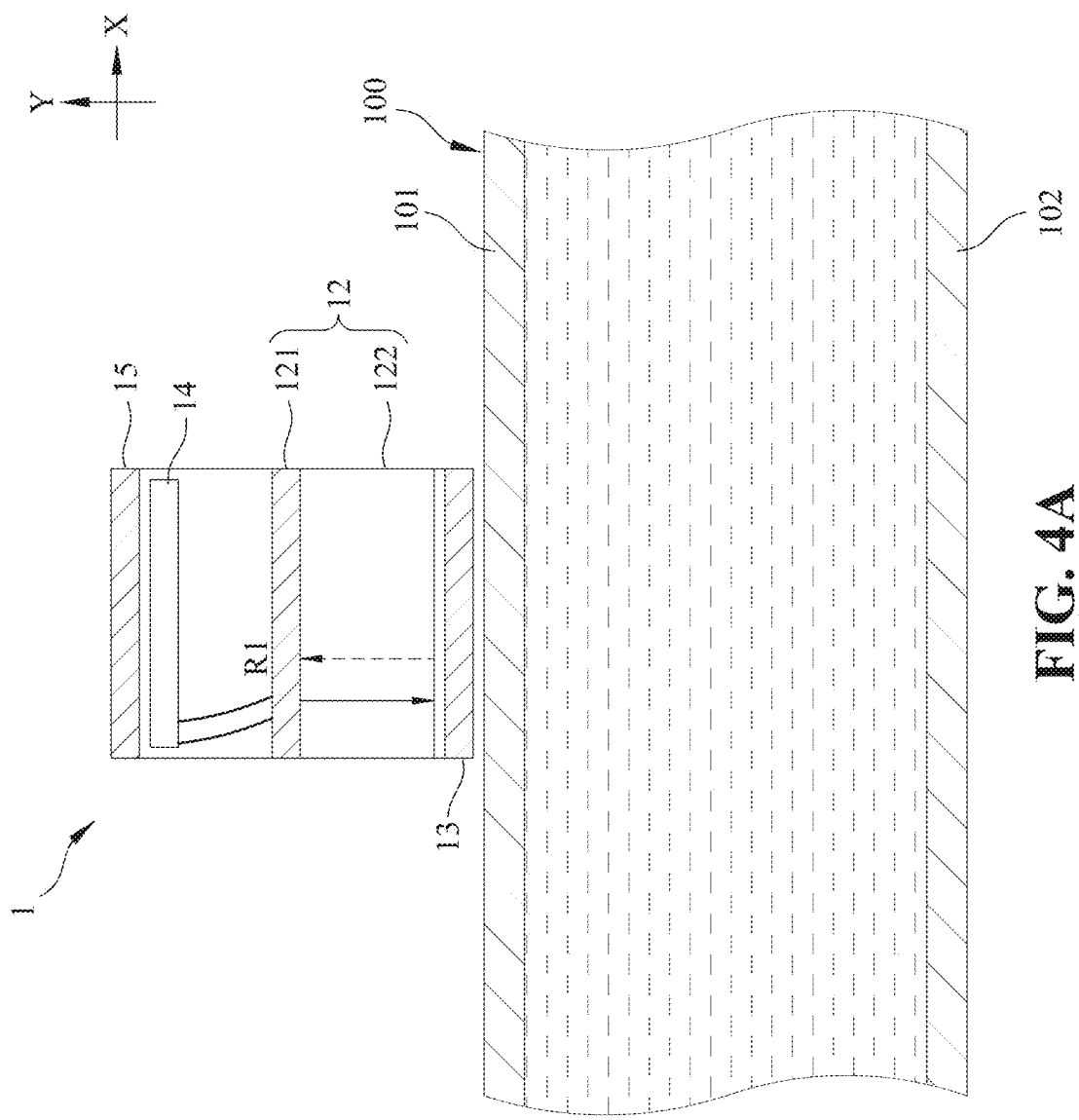
FIG. 4A is a schematic view of the monitoring device for liquid in the pipeline shown in FIG. 1 transmitting and receiving ultrasonic signals when the monitoring device of liquid pipelines is not correctly fixed to the pipeline.

FIG. 4A is a schematic view of transmitting and receiving ultrasonic signals when the monitoring device of liquid pipelines shown in FIG. 1 is not properly fixed to the pipeline. In FIG. 4A, the solid arrows represent the first sensing signals emitted by the first ultrasonic probe 12, and the dashed arrows represent the first reflection signals corresponding to the first sensing signals. In the case that the monitoring device 1 of liquid pipelines is not properly fixed to the pipeline 100, the processing module 14 controls the first ultrasonic probe 12 to transmit the first sensing signal. A gap exists between the ultrasonic coupling layer 13 and the acoustic impedance matching layer 122 and/or the outer surface of the pipeline 100. Since the acoustic impedance matching layer 122 or the ultrasonic coupling layer 13 and the air have a great difference in acoustic impedance, the gap will directly reflect a large part of the first sensing signal to the piezoelectric material layer 121 of the first ultrasonic probe 12, i.e., the acoustic impedance matching layer interface reflection signal R1, or the acoustic impedance matching layer interface reflection signal R1 and the ultrasonic coupling layer interface reflection signal R2, and only a very small part of the first sensing signal and the first reflection signal are lost in travelling through the acoustic impedance matching layer 122 or the ultrasonic coupling layer 13. If the monitoring device 1 of liquid pipelines is correctly fixed to the pipeline 100, the two opposite surfaces of the ultrasonic coupling layer 13 are in close contact with the acoustic impedance matching layer 122 of the first ultrasonic probe 12 and the outer surface of the pipeline 100, respectively, The first sensing signal and the first reflection signal must be lost due to the first pipe wall 101 going back and forth through the pipeline 100; therefore, the maximum intensity of the first reflection signal when the monitoring device 1 of liquid pipelines is not correctly fixed to the pipeline 100 must be greater than the maximum intensity of the first reflection signal when the monitoring device 1 of liquid pipelines is correctly fixed to the pipeline 100.

Figure 4B:
FIG. 4B is a schematic diagram of the time domain signal of receiving ultrasonic signals of the monitoring device of liquid pipelines shown in FIG. 4A transmitting and receiving ultrasonic signals when the monitoring device of liquid pipelines is not correctly fixed to the pipeline.

FIG. 4B is a schematic diagram of a time domain signal of transmitting and receiving ultrasonic signals when the monitoring device for liquid in the pipeline shown in FIG. 4A is not properly fixed to the pipeline. As shown in FIGS. 4A and 4B, the processing module 14 pre-stores the maximum signal threshold Rmax, and the definition of the maximum signal threshold Rmax may use a specific ratio of the maximum value of the measured first reflection signal of the known empty pipe 100, for example, but not limited to, 110%, 120%, 130%, or 140%, or a specific ratio of the maximum or average intensity of the first sensing signal, for example, but not limited to, 20%, 30%, 40%, or 50%. If the processing module 14 determines that the first period signal is greater than the first minimum signal threshold Rmin1 and greater than the maximum signal threshold Rmax, and the second period signal is less than the second minimum signal threshold Rmin2, then an inspection signal is generated to indicate that the monitoring device of liquid pipelines is not properly fixed, i.e., the fixture 11 is not properly fixed; or, the first ultrasonic probe 12 is not set correctly. After receiving the inspection signal from the processing module 14, the display unit 15 displays the inspection signal indicating that the monitoring device 1 of liquid pipelines is not properly fixed by means of light, text or image information. Using the empirical result of a 2-inch PVC pipe with a pipe wall thickness of 4 mm, the first ultrasonic probe emitting a first sensing signal with a frequency of 2 Mhz and an intensity of 10 V, at 20 degrees Celsius as an example, the maximum intensity of the first period signal when the first ultrasonic probe 12 is not properly set is greater than 855 mV, and the second period signal is less than the second minimum signal threshold Rmin2, such as, 100 mV; when the first ultrasonic probe 12 is properly set, but with abnormal liquid in the pipeline 100, i.e., empty pipeline, or having large amount of air bubbles or solids, the maximum intensity of the first period signal is around 638 mV, and the second period signal is less than the second minimum signal threshold Rmin2. The processing module 14 presets the maximum signal threshold to be 700 mV, so that it can be determined whether the first ultrasonic probe 12 is set correctly.

Figure 5:
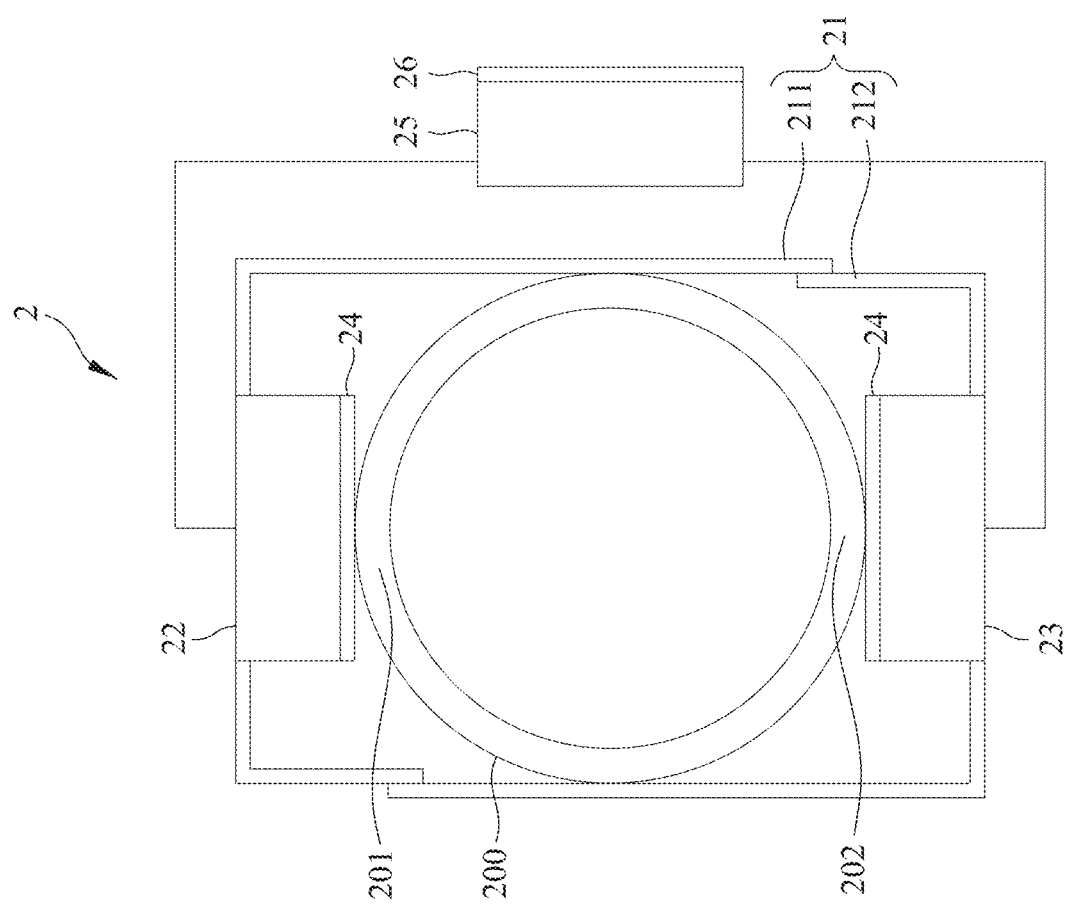
FIG. 5 is a schematic cross-sectional view of the monitoring device of liquid pipelines according to another embodiment of the present invention along the radial direction of the pipeline.

FIG. 5 is a schematic cross-sectional view of the monitoring device of liquid pipelines according to another embodiment of the present invention along the pipeline radial direction. As shown in FIG. 5, the monitoring device 2 liquid pipelines includes: a fixture 21, a first ultrasonic probe 22, a second ultrasonic probe 23, a plurality of ultrasonic coupling layers 24, a processing module 25, and a display unit 26. The fixture 21 is detachably fixed on the outer surface of the pipeline 200, the first ultrasonic probe 22 and the second ultrasonic probe 23 are arranged on the fixture 21 along the radially opposite sides of the pipeline 200, and the ultrasonic coupling layers 24 are respectively clamped on the first ultrasonic probe 22 and a first outer surface of the pipeline 200, and on the second ultrasonic probe 23 and a second outer surface of the pipeline 200. The processing module 25 is connected to the first ultrasonic probe 22 and the second ultrasonic probe 23 through wired or wireless communication. The display unit 26 is connected to the processing module 25 via wired or wireless communication. The fixture 21 includes a first frame 211 and a second frame 212 that can be locked against each other. The structures and functions of the first ultrasonic probe 22, the second ultrasonic probe 23, the processing module 25 and the display unit 26 are the same as the first ultrasonic probe 12, the processing module 14 and the display unit 15 of the monitoring device 1 of liquid pipelines described above.

When the pipeline 200 is filled with liquid, the processing module 25 controls the first ultrasonic probe 22 to transmit the first sensing signal along the radial direction of the pipeline 200 and receive the first reflection signal corresponding to the first sensing signal, controls the second ultrasonic probe 23 to receive the first sensing signal that passes through the first pipe wall 201 radially adjacent to the first ultrasonic probe, the liquid, and the second pipe wall 202 radially adjacent to the second ultrasonic probe 23 along the radial direction of the pipeline 200. Assuming that the time for the ultrasonic signal to pass through the first pipe wall 201 and the ultrasonic coupling layer 24 is not different from the time for passing through the second pipe wall 202 and the ultrasonic coupling layer 24, and the ultrasonic coupling layer 24 is respectively correctly attached to the first outer surface of the pipeline 200 and the first ultrasonic probe 22, as well as the second outer surface of the pipeline 200 and the second ultrasonic probe 23, then the time difference between the first ultrasonic probe 22 receiving the reflection signal from the second inner surface of the pipeline, i.e., the ultrasonic signal passing through the first pipe wall 201 and the liquid twice, and the second ultrasonic probe 23 receiving the first sensing signal, i.e., the ultrasonic signal passing through the first pipe wall 201, the liquid, and the second pipe wall 202 once, can be regarded as the time required by the ultrasonic signal to radially pass through the liquid between the first inner surface and the second inner surface, i.e., the inner diameter of the pipeline 200. According to the pre-stored minimum signal threshold, the processing module 25 analyzes the time difference between the time points of the second inner surface of the pipeline 200 reflecting the first sensing signal to the first ultrasonic probe 12 and the time point of the second ultrasonic probe 23 receiving the first sensing signal. Based on the time difference between the second inner surface of the pipeline 200 reflecting the first sensing signal to the first ultrasonic probe 22 and the second ultrasonic probe 23 receiving the first sensing signal, and the inner diameter of the pipeline 200, the measured ultrasonic speed in the liquid can be generated.

Figure 6B:
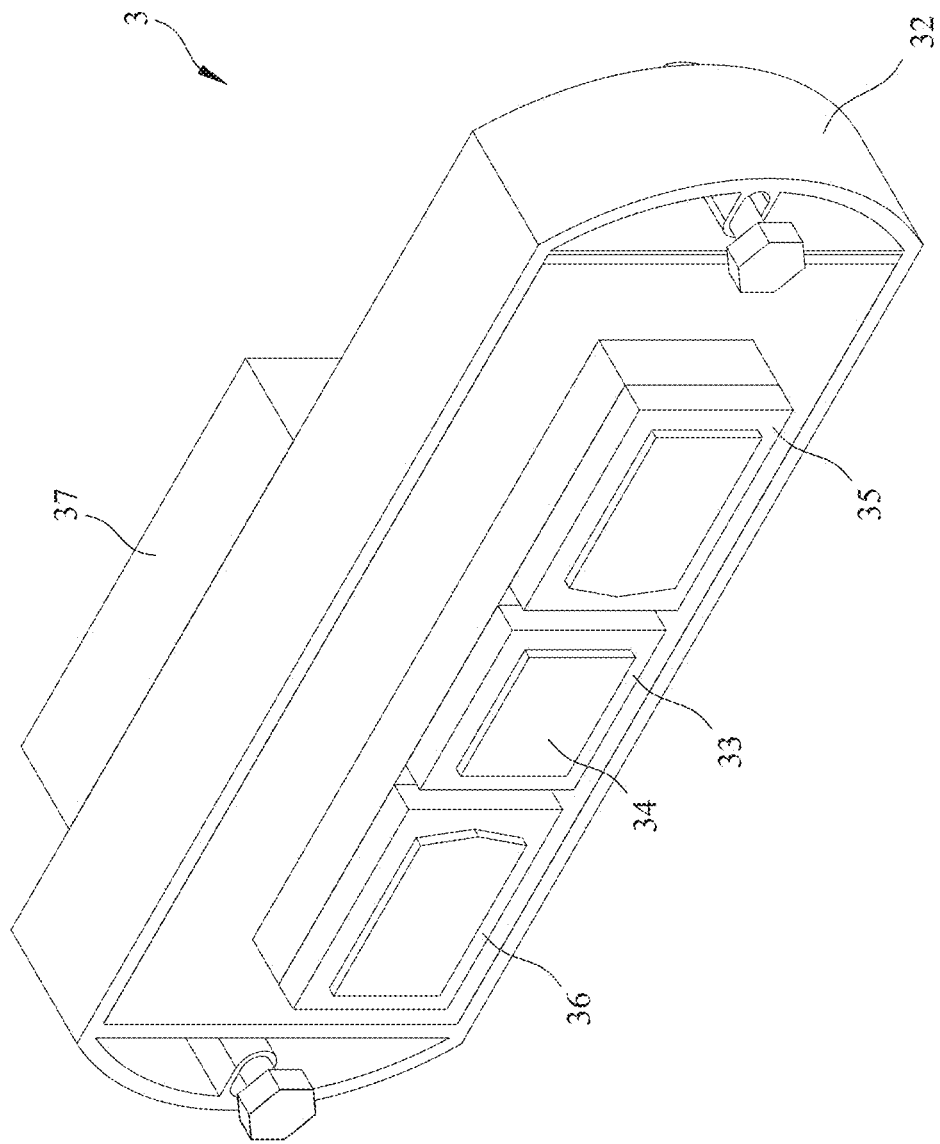
FIG. 6B is a top view of the casing shown in FIG. 6A.

When the aforementioned monitoring device of liquid pipelines is combined with sensing elements for measuring other physical properties, the present invention can further monitor the state of the pipeline liquid. FIG. 6A is a schematic side view of another embodiment of the monitoring device of liquid pipelines of the present invention, and FIG. 6B is a top view of the casing shown in FIG. 6A. As shown in FIGS. 6A and 6B, the monitoring device of liquid pipelines 3 includes a fixture 31, a casing 32, a first ultrasonic probe 33, an ultrasonic coupling layer 34, a temperature sensor 35, a vibration sensor 36, a processing module 37, and a display unit 38. The fixture 31 is detachably fixed on the outer surface of the pipeline 300, the casing 32 is arranged on the fixture 31, the first ultrasonic probe 33, the temperature sensor 35 and the vibration sensor 36 are disposed in the casing along the axial direction of the pipeline 300, and connected to the processing module 37. The ultrasonic coupling layer 34 is sandwiched between the first ultrasonic probe 33 and the outer surface of the pipeline 300, and the display unit 38 is connected to the processing module 37. The temperature sensor 35 is used to measure the temperature of the outer surface of the pipeline 300, and the vibration sensor 36 is used to measure the vibration state of the pipeline 300.

The temperature sensor 35 and the vibration sensor 36 must be attached to the outer surface of the pipeline 300 to accurately measure the temperature and vibration state of the pipeline 300. If the temperature sensor 35 or the vibration sensor 36, for some reason, e.g., vibration or collision, is not fitted to the outer surface of the pipeline 300, the wrong temperature or vibration state may be measured, and the user cannot judge whether the temperature of the existing sensors for measuring the pipeline temperature or pipeline vibration fit the outer surface of the pipeline, and whether the displayed temperature or vibration state is credible. In the present embodiment, the first ultrasonic probe 33, the temperature sensor 35, and the vibration sensor 36 are disposed in the casing 32, and the measuring surface of the first ultrasonic probe 33, the temperature sensor 35, and the vibration sensor 36 are exposed through one side surface of the casing 32. If the fixture 31 is not properly fixed or the casing 32 is not set correctly, or a gap existing between the first ultrasonic probe 33, the temperature sensor 35, the vibration sensor 36 and the outer surface of the pipeline 300, the processing module 37, which store the minimum signal threshold and the maximum signal threshold, controls the first ultrasonic probe 33 to transmit the first sensing signal, and the gap between the ultrasonic coupling layer 34 and the acoustic impedance matching layer of the first ultrasonic probe 33 and/or the outer surface of the pipeline 300 directly reflects a large part of the first sensing signal to the first ultrasonic probe 33, and only a small part of the first sensing signal and the first reflection signal are lost passing through the acoustic impedance matching layer or the ultrasonic coupling layer 34. The processing module 37 analyzes the first period signal and the second period signal from the first reflection signal, and determines that the first period signal is greater than the maximum signal threshold and the second period signal is less than the minimum signal threshold, and then generates an inspection signal indicating that the fixture 31 is not properly fixed or the casing 32 is incorrectly set; the display unit 38 displays the inspection signal. Thereby, the user can confirm whether the temperature displayed by the monitoring device 3 of liquid pipelines or the vibration state displayed by the vibration sensor 36 are the actual measurements by the temperature sensor 35 or the vibration sensor 36 measuring the outer surface of the pipeline 300.

Figure 7A:
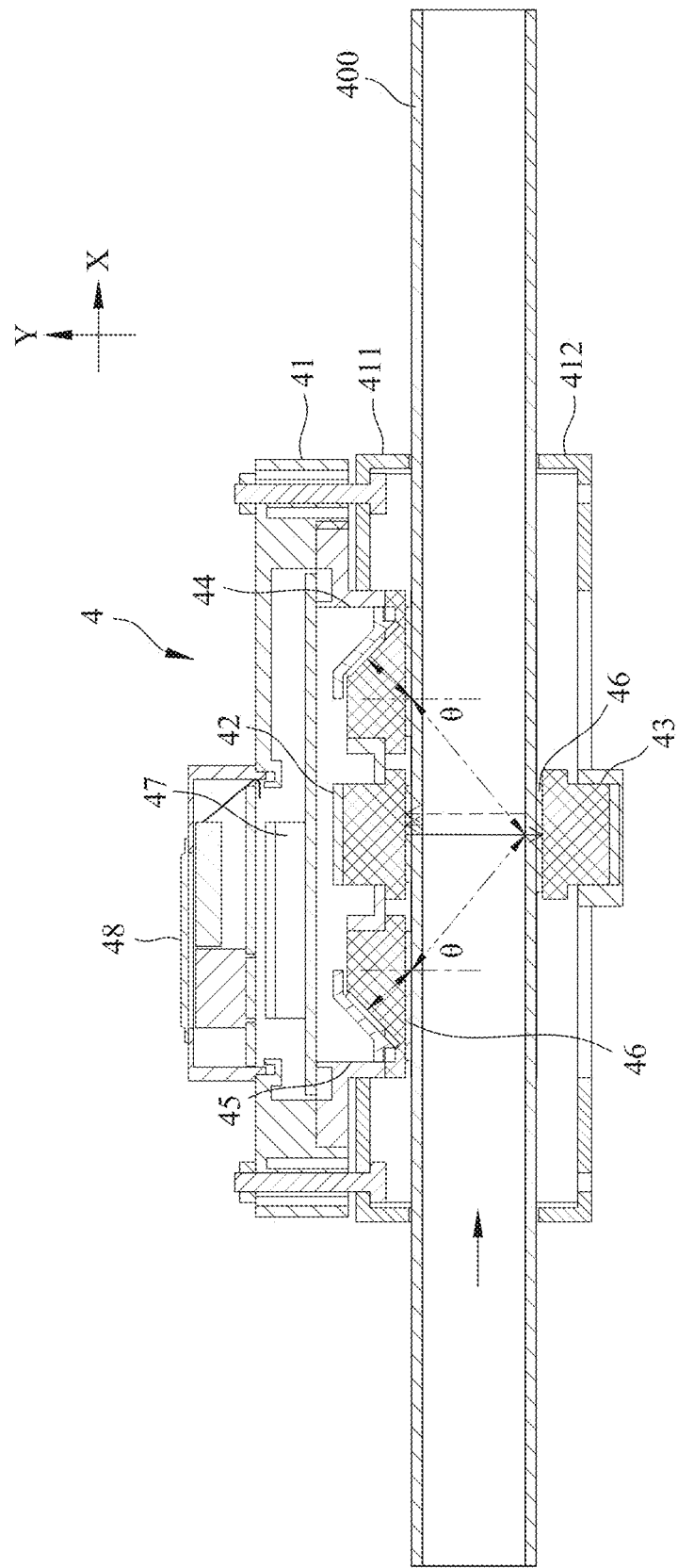
FIG. 7A is a schematic cross-sectional view of the monitoring device of liquid pipelines according to another embodiment of the present invention along the axis of the pipeline.
Figure 7B:
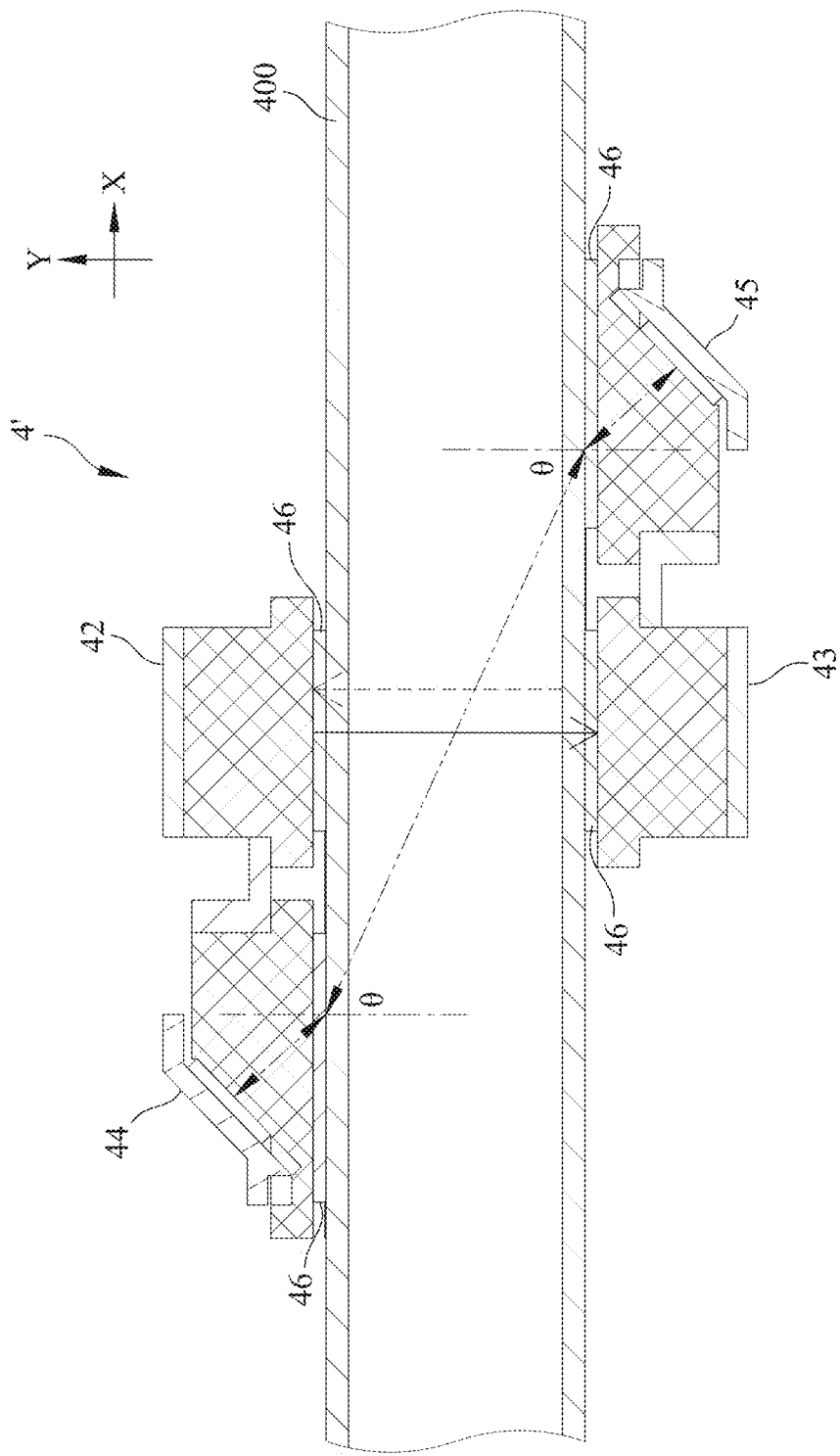
FIG. 7B is another embodiment of the monitoring device of liquid pipelines of the present invention along the axis of the pipeline.

FIG. 7A is a schematic cross-sectional view of the monitoring device of liquid pipelines according to another embodiment of the present invention along the axial direction of the pipeline, and FIG. 7B is a schematic cross-sectional view of the monitoring device of liquid pipelines according to another embodiment of the present invention. As shown in FIGS. 7A and 7B, the monitoring device of liquid pipelines 4 includes: a fixture 41, a first ultrasonic probe 42, a second ultrasonic probe 43, a third ultrasonic probe 44, a fourth ultrasonic probe 45, a plurality of ultrasonic coupling layer 46, a processing module 47 and a display unit 48. The fixture 41 is detachably fixed on the outer surface of a pipeline 400, the first ultrasonic probe 42, the second ultrasonic probe 43, the third ultrasonic probe 44, and the fourth ultrasonic probes 45 are arranged in the fixture 41, and the plurality of ultrasonic coupling layers 46 are respectively sandwiched between the first ultrasonic probe 42, the second ultrasonic probe 43, the third ultrasonic probe 44, the fourth ultrasonic probe 45 and the outer surface of the pipeline 400. The processing module 47 is connected to the first ultrasonic probe 42, the second ultrasonic probe 43, the third ultrasonic probe 44, and the fourth ultrasonic probe 45 via wired or wireless communication, and the display unit 48 is connected via wired or wireless communication to the processing module 47. The fixture 41 includes a first frame 411 and a second frame 412 that can be locked against each other. The structures and functions of the first ultrasonic probe 42, the second ultrasonic probe 43, the third ultrasonic probe 44, the fourth ultrasonic probe 45, the processing module 47, and the display unit 48 are the same as the first ultrasonic probe 12, the processing module 14, and the display unit 15 of the aforementioned monitoring device of liquid pipelines 1.

In the monitoring device of liquid pipelines 4 shown in FIG. 7A, the first ultrasonic probe 42, the third ultrasonic probe 44 and the fourth ultrasonic probe 45 are arranged along the axial direction of the pipeline 400, i.e., the X axis in FIG. 7A. The second ultrasonic probe 43 is arranged on the side of the pipeline 400 radially opposite to the first ultrasonic probe 42. In the monitoring device of liquid pipelines 4' shown in FIG. 7B, the first ultrasonic probe The probe 42 and the third ultrasonic probe 44 are arranged along the axial direction of the pipeline 400, and the second ultrasonic probe 43 and the fourth ultrasonic probe 45 are arranged along the axial direction on one side opposite to the first ultrasonic probe 42 and the third ultrasonic probe 44. As shown in FIGS. 7A and 7B, the monitoring devices of liquid pipelines 4, 4', the connection line between the first ultrasonic probe 42 and the second ultrasonic probe 43 is parallel to the radial direction of the pipeline 400, i.e., perpendicular to the axial direction of the pipeline 400, the third ultrasonic probe 44 and the fourth ultrasonic probe 45 are arranged at a distance along the axial direction of the pipeline 400, and the third ultrasonic probe 44 and the fourth ultrasonic probe 45 are located on the two sides of the first ultrasonic probe 42; In other embodiments, the third ultrasonic probe 44 and the fourth ultrasonic probe 45 are located on the same side of the first ultrasonic probe 42.

In the case where the pipeline 400 transports liquid, the processing module 47 shown in FIG. 7A can control the first ultrasonic probe 42 to transmit the first sensing along the radial direction of the pipeline 400, i.e., the direction shown by the Y axis in FIG. 7A, and to receive the first reflection signal corresponding to the first sensing signal, and then analyze the first reflection signal to obtain the time difference between the time point when the first inner surface which is radially adjacent to the first ultrasonic probe 42 reflects the first sensing signal to the first ultrasonic probe 42 and time point when the second inner surface which is radially opposite to the first ultrasonic probe 42 reflects the first sensing signal to the first ultrasonic probe 42. Based on the above time difference and twice the radial distance of the first inner surface and the second inner surface, the measured ultrasonic speed of the liquid is generated. The processing module 47 shown in FIG. 7B can control the first ultrasonic probe 42 to transmit the first sensing along the radial direction of the pipeline 400 and to receive the first reflection signal corresponding to the first sensing signal, and then controls the second ultrasonic probe 43 to receive the first sensing signal passing through the pipeline 400. The processing module 47 analyzes the time difference between the time point when the first ultrasonic probe 42 receives the reflection signal from the second inner surface of the pipeline and the time point when the second ultrasonic probe 43 receives the first sensing signal. Based on the above time difference and the inner diameter of the pipeline 400, the measured ultrasonic speed of the liquid is generated.

The processing module 47 controls a third ultrasonic probe 44 to transmit the third sensing signal along an oblique direction forming an angle with the radial direction of the pipeline 400 and the fourth ultrasonic probe 45 to receive the third sensing signal, analyzes the transmission time of the third sensing signal from the third ultrasonic probe 44 to the fourth ultrasonic probe 45, controls the fourth ultrasonic probe 45 to transmit a fourth sensing and the third ultrasonic probe 44 to receive the fourth sensing signal, and analyzes the transmission time of the fourth sensing signal from the fourth ultrasonic probe 45 to the third ultrasonic probe 44. According to the calculation formula to generate the liquid flow: instantaneous flow rate Q=liquid flow rate v×radial cross-sectional area A of the pipeline, the liquid flow rate v=the transmission time difference between the third sensing signal and the fourth sensing signal Δt×liquid ultrasonic speed C2/2×the inner diameter of the pipeline D×tan Θ, where Θ is the incident angle of the third sensing signal passing through the liquid, pre-stored in the processing module 47.

It is worth noting that the existing non-invasive ultrasonic flow-meter method for generating pipeline liquid flow is to pre-store the linear function of a specific liquid, for example, water or oil, in a specific range of forward and reverse flow transport time difference to flow rate, and by measuring the transport time difference between the forward and reverse flow of the liquid in the pipeline, and the liquid flow rate can be generated through interpolation, but the liquid ultrasonic speed is not measured. This type of approach usually generates flow rate estimations with greater errors. When the liquid or environment condition changes exceed the pre-stored range of the linear function, the flow rates produced by existing non-intrusive ultrasonic flow meters may reach levels that affect production. In addition, when the liquid or environmental conditions change exceeds the preset conditions of the ultrasonic flow-meter, the ultrasonic probe cannot receive the sensing signal transmitted obliquely, so that the flow measurement cannot be generated, and the relative position of the two ultrasonic probes arranged in the axial direction must be adjusted. However, the personnel on the production site usually do not have the expertise to adjust the ultrasonic probes, and need to wait for the technical personnel from the ultrasonic flow-meter manufacturer to handle, which affects the monitoring function and production safety.

The monitoring device of liquid pipelines of the present invention has the function of actually measuring the ultrasonic speed of the liquid, and generates the liquid flow with the measured liquid ultrasonic speed, which not only improves the accuracy of the measurement flow, but also expands the measurement range, in both the liquid type and flow. When the processing module 47 analyzes that the first ultrasonic probe 42 receives the second period signal or the second ultrasonic probe 43 receives the first sensing signal through the pipeline is greater than the minimum signal threshold, that is, the ultrasonic signal can be transmitted/received radially, and the third sensing signal received by the fourth ultrasonic probe 45 or the fourth sensing signal received by the third ultrasonic probe 44 is smaller than the minimum signal threshold, that is, the ultrasonic signal cannot be received obliquely, the processing module 47 generates a calibration signal indicating requiring adjustment of the relative position of the third ultrasonic probe 44 and the fourth ultrasonic probe 45. With this function, the user at the production site only needs to move the third ultrasonic probe 44 or the fourth ultrasonic probe along the axis of the pipeline 45 until the third sensing signal or the fourth sensing signal is greater than the minimum signal threshold, and then the processing module 47 stops the calibration signal and continues to generate flow data, without waiting for the technical personnel from the ultrasonic flow-meter manufacturer to process, which greatly reduces the expertise barrier of the calibration of the ultrasonic probes and improves the convenience of installing and calibrating monitoring device of liquid pipelines.

In summary, as there is little noise in the ultrasonic frequency range in the general environment, and the ultrasonic probe only transmits and receives ultrasonic signals in a specific frequency range, the monitoring device of liquid pipelines of the present invention using the ultrasonic signal to monitor the pipeline and liquid can greatly reduce the interference from environmental noise, and accurately determine whether the pipeline is empty or the liquid has a large amount of air bubbles or a large amount of solids. The monitoring device of liquid pipelines of the present invention can be further combined with ultrasonic probes and sensors measuring or detecting other physical properties to expand the monitoring items, as well as self-diagnose whether the sensors are correctly installed on the pipeline, reduce the technical barrier for calibrating the sensors, improve the reliability of the monitoring data, and achieve accurate and convenient monitoring the liquid in the pipeline at all time.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A monitoring device of liquid pipelines, comprising:
a fixture, detachably fixed on an outer surface of a pipeline;
a first ultrasonic probe, arranged in the fixture;

a processing module, connected to the first ultrasonic probe and storing a minimum signal threshold, and controlling the first ultrasonic probe to transmit a first sensing signal along a radial direction of the pipeline and to receive a first reflection signal corresponding to the first sensing signal; based on the time of a first inner surface and a second inner surface being respectively radially adjacent to and opposite to the first ultrasonic probe reflect the first sensing signal to the first ultrasonic probe, analyzing the first reflection signal to obtain a first period signal and a second period signal; and if the first period signal being greater than the minimum signal threshold and the second period signal being less than the minimum signal threshold, generating a warning signal indicating the abnormality of the first ultrasonic probe or the liquid in the pipeline;

a third ultrasonic probe and a fourth ultrasonic probe, arranged in the fixture, and respectively connected to the processing module; and a display unit, connected to the processing module for displaying the warning signal, wherein the minimum signal threshold refers to a minimum signal intensity threshold;

the processing module analyzes a time difference between the first inner surface and the second inner surface reflecting the first sensing signal to the first ultrasonic probe, and according to the time difference and twice the radial distance between the first inner surface and the second inner surface, produces a measured sound speed of the liquid;

the processing module controlling the third ultrasonic probe to transmit a third sensing signal along a direction forming an angle with the radial direction of the pipeline and the fourth ultrasonic probe to receive the third sensing signal, and analyzing the transmission time of the third sensing signal from the third ultrasonic probe to the fourth ultrasonic probe; and processing module controlling the fourth ultrasonic probe to transmit a fourth sensing signal along a direction forming a symmetrical angle with the angle, and the third ultrasonic probe to receive the fourth sensing signal, and analyzing the transmission time of the fourth sensing signal from the fourth ultrasonic probe to the third ultrasonic probe; according to transmission distance and the transmission time difference between the third sensing signal and the fourth sensing signal, the measured ultrasonic speed of the liquid, the radial area of the pipeline, and an incident angle of the third sensing signal or the fourth sensing signal passing through the liquid, the processing module generating the flow rate of the liquid;

if the processing module determines that the second period signal is greater than the minimum signal threshold and the third sensing signal or the fourth sensing signal is less than the minimum signal threshold, the processing module generates a calibration signal indicating the need to adjust the relative positions of the third ultrasonic probe and the fourth ultrasonic probe.

2. The monitoring device of liquid pipelines according to claim 1, wherein from the time point when the first sensing signal is emitted, the time for distinguishing the first period signal and the second period signal is between the time for the first inner surface to reflect the first sensing signal to the first ultrasonic probe and the time for the second inner surface to reflect the first sensing signal to the first ultrasonic probe.

3. The monitoring device of liquid pipelines according to claim 1, wherein the processing module stores a maximum signal threshold; if the processing module determines that the first period signal is greater than the maximum signal threshold and the second period signal is less than the minimum signal threshold, an inspection signal is generated indicating that the fixture is not correctly fixed or the first ultrasonic probe is not correctly set; the display unit displays the inspection signal, wherein the maximum signal threshold refers to a maximum signal intensity threshold.

4. The monitoring device of liquid pipelines according to claim 3, further comprising: a casing and a temperature sensor, wherein the casing being arranged on the fixture, the temperature sensor and the first ultrasonic probe being arranged inside the casing and connected to the processing module, and the temperature sensor being used to measure the temperature of the outer surface of the pipeline.

5. The monitoring device of liquid pipelines according to claim 4, wherein if the processing module determines that the first period signal is greater than the maximum signal threshold and the second period signal is less than the minimum signal threshold, an inspection signal indicating that the fixture is not correctly fixed or the casing is not correct set; the display unit displays the inspection signal.

6. The monitoring device of liquid pipelines according to claim 1, further comprising: a second ultrasonic probe, arranged on the fixture along the radial direction of the pipeline with the first ultrasonic probe on opposite positions, and connected to the processing module; the processing module controlling the second ultrasonic probe to receive the first sensing signal passing through the pipeline along the radial direction of the pipeline, if the processing module determining that the first sensing signal received by the second ultrasonic probe to be less than the minimum signal threshold, generating a warning signal representing the abnormality of the first ultrasonic probe or the liquid in the pipeline.

7. The monitoring device of liquid pipelines according to claim 6, wherein if the processing module determines that the first sensing signal received by the second ultrasonic probe is greater than the minimum signal threshold, then the processing module analyzes a time difference between the second inner surface reflecting the first sensing signal to the first ultrasonic probe and the second ultrasonic probe receiving the first sensing signal, and according to the time difference and twice the radial distance between the first inner surface and the second inner surface, produces a measured ultrasonic speed of the liquid.

* * * * *